(No Model.)
C. R. McKINSTRY.
MILK PAIL.
No. 604,176. Patented May 17, 1898.
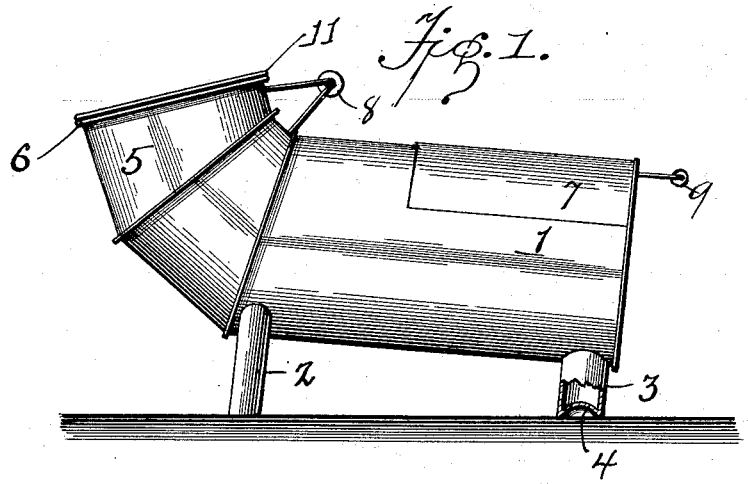
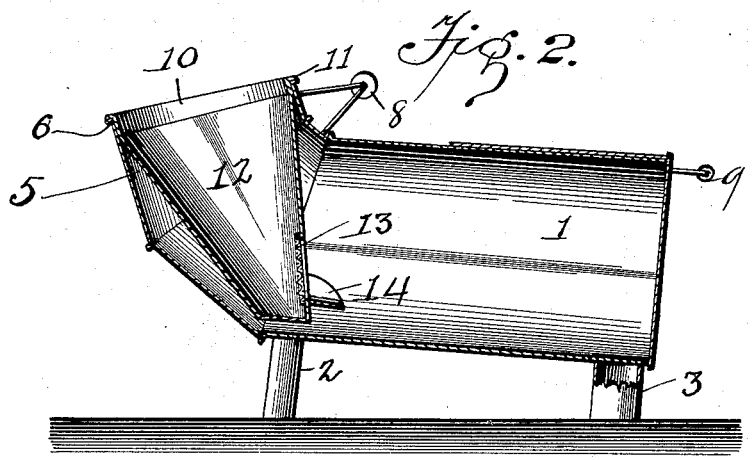
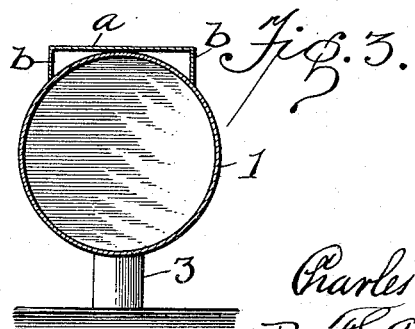
Witnesses
N. Roy Appleman
David Nehadinik
Inventor
Charles R. McKinstry
By J. F. Appleman
Attorney
THE NORRIS PETERS CO., PHOTO-LITHO., WASHINGTON, D. C.

UNITED STATES PATENT OFFICE.

CHARLES R. McKINSTRY, OF MERCERSBURG, PENNSYLVANIA.

MILK-PAIL.

SPECIFICATION forming part of Letters Patent No. 604,176, dated May 17, 1898.

Application filed November 8, 1897. Serial No. 657,833. (No model.)

*To all whom it may concern:*

Be it known that I, CHARLES R. MCKINSTRY, residing at Mercersburg, in the county of Franklin and State of Pennsylvania, have invented certain new and useful Improvements in Milk-Pails; and I do hereby declare the following to be a full, clear, and exact description of the invention, such as will enable others skilled in the art to which it appertains to make and use the same.

This invention relates to milk-pails, and has for its object to provide such a device that will have the combined uses of a stool and milk-pail. The pail is made in rather large sizes in order that the seat may be large and comfortable and is intended especially for use on large dairy farms, where it is advantageous to carry but few utensils.

A further object of the invention is the production of a strainer which is adapted to be used in connection with a pail of this character, whereby the milk may be strained as it flows into the receptacle; and a further object of the invention is to produce a can forming a comfortable seat that cannot be overturned by a vicious cow or otherwise on account of the weight of the operator on said can and the quick and positive command the operator has over the can at all times during the milking process.

A further advantage consists of the ease and facility with which such a can can be flushed out and cleansed, due largely to its straight interior sides.

The invention consists in the novel manner of arranging the body of the pail as well as in the other features and details of construction to be hereinafter more fully described, and pointed out in the claims.

In order that those skilled in the art to which this invention appertains may understand how to make and use the same, reference is had to the accompanying drawings, forming part of this specification, wherein like characters of reference denote corresponding parts in the several views, in which—

Figure 1 is a view in elevation of a milking-pail made in accordance with my invention. Fig. 2 is a vertical longitudinal sectional view showing a strainer applied thereto. Fig. 3 is a transverse sectional view of a slightly-modified form.

In the drawings, 1 indicates the body of the pail, arranged in a horizontal position and supported by the legs 2 at the forward end and the leg 3 at the rear end near the center of the body, said legs having cupped or concaved lower ends, as shown at 4. The last-mentioned leg is shorter than the others, holding the body in a slightly-inclined position, so that the milk will be directed to the rear of the can.

At the forward end of the body is an upturned mouth 5 to receive the milk, and around the edge of the mouth is a flange 6, for the purpose hereinafter set forth. On the upper side of the body, near the rear end thereof, is a reinforcement 7 to be used as a seat, it being understood that the parts are made of some material, such as blocked tin or galvanized iron, to make the device strong enough to support a person. The milker is supposed to sit astraddle of the can or pail on the seat 7, facing the mouth, the legs extending forward, and it will be noted that the legs of the pail or can raise it sufficiently from the ground to enable the operator to assume a comfortable position.

In Fig. 3 I have shown a slightly-modified form of seat, the reinforcement *a* having flanges *b* formed on either side thereof, making the seat straight across the top, thereby rendering it unnecessary for a person to straddle the can or pail, as a position may be assumed with equal comfort or security with both legs on the same side.

A handle 8 is rigidly secured to the rear side of the mouth, and at the rear end of the can or pail is hinged a second handle 9, so that when desired two people may carry the pail; yet the handle 9 may be folded, so that it is possible for the device to be stood on end to economize space. This is very desirable where the cans have to be transported long distances in the train and it is important that all available parts of the car be occupied.

I find it of great convenience to provide a strainer in the mouth of the pail in order that the necessity of transferring the milk from one receptacle to another when it is being strained may be overcome. I provide a strainer consisting of a cylindrical section 10, adapted to telescopically fit within the mouth of the can or pail, and around this section 10

I form a flange 11, fitting against the flange of the mouth. The body 12 of the strainer is funnel-shaped and has an opening in the side thereof covered by the straining material 13, and leading from this opening is the spout 14.

It will be especially noted that the mouth of my improved pail is not turned at right angles to the body, but rather at an obtuse angle. This is for the purpose of allowing a paddle to be inserted to stir the milk to cool it, as it is well known that milk cannot be shipped while warm without great danger of injuring its quality. It will also be noted that various changes may be resorted to, such as the one mentioned in connection with the seat, yet the general spirit and plan of my invention will not be departed from.

Having fully described my invention, what I claim as new, and desire to secure by Letters Patent, is—

1. A combined milk-can and stool consisting of a body having a squared end on which the can is adapted to rest when in an upright position, means for supporting said can in a substantially horizontal position and an upturned mouth formed on the forward end of the can, as and for the purpose described.

2. In a combined milk-pail and stool, a can consisting of a body having a squared end on which the can is adapted to rest when in an upright position, legs on the side of the can to support it in a substantially horizontal position, an upturned mouth formed on the forward end of the can and a reinforcement forming a seat at the rear portion of the can, as shown and described.

3. A milk-can and stool consisting of a body having a squared end on which the can is adapted to rest when in an upright position, legs on the side of the can to support it in a substantially horizontal position, an upturned mouth formed on the forward end of the can, a reinforcement forming a seat on the rear portion of the can, and handles rigidly and pivotally secured to the forward and rear ends respectively of said body, as and for the purpose described.

4. In a milk-can and stool, a body having a squared end on which said can rests when in an upright position, legs on the side of the can adapted to support the same in a substantially horizontal position, an upturned mouth formed on the forward end of the can, and a seat consisting of a flat portion, and flanges extending downward from the sides thereof, said flanges being secured to the side of the can near the rear end thereof opposite the legs, as and for the purpose set forth.

5. A can consisting of a body lying approximately horizontally, legs supporting said body, a seat comprising a reinforcement having downwardly-projecting flanges secured at the rear end of the body to the side thereof making said seat straight across the top, and an upturned mouth formed on the forward end of the body, as and for the purpose described.

In testimony whereof I have signed this specification in the presence of two subscribing witnesses.

CHARLES R. McKINSTRY.

Witnesses:
LUTHER A. MANN, Jr.,
ALBERT O. MURRAY.